(12) United States Patent
Dionne (10) Patent No.: US 6,775,628 B2
(45) Date of Patent: Aug. 10, 2004

(54) LOW DISTORTION FREQUENCY TRACKING TECHNIQUE

(75) Inventor: Gregory E. Dionne, Arlington, MA (US)

(73) Assignee: Teradyne, Inc., Boston, MA (US)

( * ) Notice: Subject to any disclaimer, the term of this patent is extended or adjusted under 35 U.S.C. 154(b) by 117 days.

(21) Appl. No.: 09/995,355

(22) Filed: Nov. 27, 2001

(65) Prior Publication Data

US 2003/0101010 A1 May 29, 2003

(51) Int. Cl.⁷ .............................................. G01C 21/00

(52) U.S. Cl. ....................................... 702/69; 702/182

(58) Field of Search .............................. 702/69, 60–68, 702/75, 79, 182–185

(56) References Cited

U.S. PATENT DOCUMENTS

| | | | |
|---|---|---|---|
| 6,269,317 B1 | * | 7/2001 | Schachner et al. ............ 702/91 |
| 6,397,146 B1 | * | 5/2002 | Bruner ....................... 701/213 |
| 6,564,160 B2 | * | 5/2003 | Jungerman et al. ......... 702/106 |

* cited by examiner

Primary Examiner—Marc S. Hoff
Assistant Examiner—Edward Raymond
(74) Attorney, Agent, or Firm—Bruce D. Rubenstein; Teradyne Legal Department (57) ABSTRACT

A technique for determining the characteristics of an oscillatory test signal includes acquiring a plurality of consecutive samples of a test signal. The samples are mathematically fit to a sinusoidal model, which specifies a plurality of equations. The equations have unknowns that represent characteristics of a sinusoid that substantially intersects the plurality of samples. Solving the equations for the unknowns reveals the test signal's short-term characteristics.

22 Claims, 8 Drawing Sheets

```
/* Standard header files */
#include <stdio.h>
#include <math.h>
include <image.h> define FS    20.48MHz
define IF     5.12MHz
define SSIZE 4096 float
      raw_capture[SSIZE];
double
      interp[SSIZE],
      dft[SSIZE],
      fit[SSIZE];

main()
{move file = "TX_settling_capt.wav" size=SSIZE to: adata=raw_capture;

settling_time_dft   (raw_capture, dft, FS, IF, SSIZE);
settling_time_interp(raw_capture, interp, FS, IF, SSIZE);
settling_time_fit   (raw_capture, fit, FS, IF, SSIZE);
}
```

Fig. 4

```
/*~~~~~~~~~~~~~~~~~~~~~~~~~~~~~~~~~~~~~~~~~~~~~~~~~~~~~~~~~~~~~~~~~~~~~~*/
void settling_time_dft(cap_data,demod_signal,fs,f_if,samps)
/*~~~~~~~~~~~~~~~~~~~~~~~~~~~~~~~~~~~~~~~~~~~~~~~~~~~~~~~~~~~~~~~~~~~~~~*/
/* This module does perform an math FM-demodulation of a captured   */
/* time domain signal. It can be used for measurements like settling */
/* time of an VCO or for deviation measurements.           */
/*~~~~~~~~~~~~~~~~~~~~~~~~~~~~~~~~~~~~~~~~~~~~~~~~~~~~~~~~~~~~~~~~~~~~~~*/
float *cap_data;    /* Array of captured time domain data   */
int   samps;        /* Sample size of capture               */
float fs;           /* Sample frequency of UWRECV           */
float f_if;         /* IF frequency of UWRECV               */
double *demod_signal; /* Array of raw demodulated signal    */

{
  double *Sin,*Cos;
  double *x,*y;
  int    i,j;
  double sinsum,cossum;

int N = fs/f_if;
  /* First allocate memory */

Sin = (double *) calloc(N,sizeof(double));
  Cos = (double *) calloc(N,sizeof(double));

/* Setup sine and cosine for DFT */ for (i=0;i<N;i++)
  {
    Sin[i]=sin(2*M_PI*i/N)*(0.5*(1-cos(2*M_PI*i/N)));
    Cos[i]=cos(2*M_PI*i/N)*(0.5*(1-cos(2*M_PI*i/N)));
  }
```

Fig. 5A
(Prior Art)

```
/* Now perform DFT for every sample */ for (i=0;i<samps-N;i++)
{
  for (sinsum=cossum=j=0;j<N;j++)
  {
    sinsum += cap_data[i+j]*Sin[j];
    cossum += cap_data[i+j]*Cos[j];
  }
  demod_signal[i]=atan2(sinsum,cossum);
} for (;i<samps;i++) demod_signal[i]=0;

for (i=samps-N-1;i;i--)
{
  demod_signal[i]-= demod_signal[i-1];
  demod_signal[i] = demod_signal[i] < -M_PI ? demod_signal[i]+2*M_PI :
            demod_signal[i] >  M_PI ? demod_signal[i]-2*M_PI :
                    demod_signal[i];
}

/* From the DFT result, which is the instantaneous phase
   do calculate the frequency */ for (i=0;i<samps;i++) demod_signal[i] *= -fs / (2*M_PI);

/* Free Memory */ free (Sin);
free (Cos);
}
```

Fig. 5B
(Prior Art)

```
/*~~~~~~~~~~~~~~~~~~~~~~~~~~~~~~~~~~~~~~~~~~~~~~~~~~~~~~~~~~~~~~*/
void settling_time_interp(cap,f_inst,fs,f_if,tot_samps)
float *cap,fs,f_if;
double *f_inst;
int tot_samps;
/*~~~~~~~~~~~~~~~~~~~~~~~~~~~~~~~~~~~~~~~~~~~~~~~~~~~~~~~~~~~~~~*/
{int   i,k;
 float a,b;
 double diff[SSIZE];
 double smooth[SSIZE];
 int   x[SSIZE];
 double x_interpol[SSIZE];
 int   num_cross;
 int   smooth_factor = 1;
 float t_per_sample = 1/FS;

for (i=0;i<tot_samps;i++)
  diff[i]=f_inst[i]=x[i]=0;

num_cross = 0;
 for (i=1;i<tot_samps;i++)
  if (cap[i]<0.0 && cap[i-1]>=0.0)
   x[num_cross++] = i;

/* now do linear interpolation for exact zero crossing */
 for (i=0;i<num_cross;i++)
 {b = -1.0*(cap[x[i]-1]-cap[x[i]]);
  a = cap[x[i]]-x[i]*b;
  x_interpol[i] = -1.0*a/b;
 } for (i=0;i<num_cross-1;i++)
  diff[i] = 1.0*(x_interpol[i+1]-x_interpol[i]);

for (i=0;i<num_cross-1;i++)
  f_inst[x[i]] = fs/diff[i];

/* Fill up the rest of data */
 for (i=tot_samps-1;i>=0;i--)
  if (f_inst[i] == 0)
   f_inst[i] = f_inst[i+1];

```
/*~~~~~~~~~~~~~~~~~~~~~~~~~~~~~~~~~~~~~~~~~~~~~~~~~~~~~~~~~~~~~~*/
void settling_time_fit(rf_capture,alt,fs,f_if,samps)
float *rf_capture;
double *alt;
float fs;
float f_if;
int samps;
/*~~~~~~~~~~~~~~~~~~~~~~~~~~~~~~~~~~~~~~~~~~~~~~~~~~~~~~~~~~~~~~*/
{int i;
 int m=(fs/f_if/4);
 double lft,rgt,ctr,threshold,ratio;
 for (i=2*m;i<samps-2*m;i++)
 {lft=rf_capture[i-2*m]-rf_capture[i];
  ctr=rf_capture[i-m]-rf_capture[i+m];
  rgt=rf_capture[i]-rf_capture[i+2*m];

threshold=fabs(ctr);

ratio= ctr==0 && ( lft==0 || rgt==0) ? 1.0 :
      fabs(lft) < threshold || fabs(rgt) < threshold ?
      (rf_capture[i-2*m]-rf_capture[i+2*m])/ctr/2 :
      (rf_capture[i-3*m]-rf_capture[i+ m])/lft/4 +
      (rf_capture[i- m]-rf_capture[i+3*m])/rgt/4;

alt[i]=fs/(m*2*M_PI) * ((fabs(ratio) <= 1.0) ? acos(ratio) : 0);

LOW DISTORTION FREQUENCY TRACKING TECHNIQUE

CROSS-REFERENCES TO RELATED APPLICATIONS

Not Applicable.

STATEMENT REGARDING FEDERALLY SPONSORED RESEARCH OR DEVELOPMENT

Not Applicable.

REFERENCE TO MICROFICHE APPENDIX

Not Applicable

BACKGROUND OF THE INVENTION

1. Field of the Invention

This invention relates generally to automatic test equipment, and, more particularly, to techniques employed by automatic test equipment for sampling and analyzing waveforms.

2. Description of Related Art Including Information Disclosed Under 37 C.F.R. 1.97 and 1.98

Automatic test equipment, or "testers," are frequently called upon to measure electronic signals in states of change. During the execution of a test program for testing an electronic device, a tester generally first applies power to the device. Then the tester applies an input signal. After a prescribed delay, the tester samples the output of the device in response to the input signal. The tester then compares the samples with expected values to determine whether the test passes or fails.

The prescribed delay between applying the input signal and sampling the output signal ensures that the output signal reaches a stable state before a measurement is made. This delay is often difficult to predict, however. Therefore, test programs conventionally include delay instructions in their software to explicitly wait fixed intervals of time after applying an input signal, before sampling an output signal. To ensure that no device is measured before its output signal is ready, these delay instructions tend to specify exceedingly long intervals, sometimes two or three times as long as the longest observed settling time of the device.

Long delays excessively burden high-volume testing. Customers judge automatic test equipment largely based upon speed of test. Time spent waiting for devices to settle is therefore particularly acute when delays are imposed out of uncertainty, merely to provide a safety margin.

To reduce these delays, test engineers have developed methods for sampling an output of a DUT (device under test) after the tester applies the input signal, and for continually testing whether the output has settled. According to one prior technique, a tester samples the output signal of a DUT and repetitively performs a Discrete Fourier Transform (DFT) on successive groups of samples of the output signal. The tester monitors a characteristic of interest, for example, frequency. Once that characteristic has stabilized, the test program is allowed to resume. The DFT technique therefore adapts the test program's delay to the actual settling time of the device and reduces overall delay.

This technique does not entirely eliminate unnecessary delays, however. DFTs require long computing times. Depending upon the speed of a tester's data processing hardware, as well as the sampling rate and other factors, the tester's DFT throughput may not be able to keep pace with the incoming data stream. Therefore, DFTs may entail unnecessary delays. Moreover, DFTs have relatively poor frequency resolution. The discrete "bins" within which DFTs assign frequencies may be more widely spaced than required. Of course, DFTs' properties can be changed to increase frequency resolution, but this improvement is gained only at the expense of frequency range or processing speed. In addition, DFTs generally require that samples be multiplied by a windowing function, such as a Hamming, Hanning, or Blackman windowing function. As known to those skilled in the art, windowing functions introduce errors, which further degrade the accuracy of the DFT technique.

Another technique has been to sample the output signal of a device and apply linear interpolation to determine the times at which the output signal crosses zero ("zero" in this context refers to average or DC value of the output signal, rather than necessarily to 0 volts DC). The test program identifies samples on opposite sides of zero, and interpolates between the samples to deduce the zero-crossing times. Frequency is then computed as the inverse of the difference between consecutive zero-crossing times of the same slope (i.e., rising to rising, or falling to falling). The zero-crossing method runs much faster than the DFT method—it requires only a few calculations. It also generally has better frequency resolution, because it identifies zero-crossings based upon specific samples that occur at precise, known instants of time. Nevertheless, the zero-crossing method still suffers from inaccuracies, owing to the limited ability of linear interpolation to accurately identify the zero-crossings of inherently non-linear sinusoids.

What is needed is a more accurate, high-speed technique for determining the characteristics of a test signal as a function of time.

BRIEF SUMMARY OF THE INVENTION

With the foregoing background in mind, it is an object of the invention to determine, quickly and accurately, the characteristics of an oscillatory test signal.

To achieve the foregoing object, as well as other objectives and advantages, a technique for determining the characteristics of an oscillatory test signal includes acquiring a plurality of consecutive samples of a test signal. The method includes mathematically fitting a sinusoidal model to the samples. The sinusoidal model specifies a plurality of equations having unknowns that represent characteristics of an ideal sinusoid that substantially intersects the plurality of samples. Solving for the unknowns reveals the test signal's characteristics.

According to one aspect of the invention, a tester applies the technique for determining when a test signal from a device under test has settled. The tester repetitively samples the test signal, applies the model, and solves for at least one of the test signal's characteristics. When, over the course of multiple iterations, the test signal is found to stabilize, the test program can safely advance, without wasting valuable test time.

According to another aspect of the invention, a tester applies the above-described technique for characterizing a transient response of a test signal. According to this variation, a test program induces a change in a device under test, and monitors the test signal over time using the technique. The test program ascertains the output's response to the change by referring to the test signal's characteristics as reported by the technique over time.

According to yet another aspect of the invention, a tester applies the above-described technique for characterizing a frequency-modulated or phase-modulated test signal. The frequency of the test signal can be directly reported, on a cycle-by-cycle basis. Alternatively, the frequency of the test signal can be integrated with respect to time to provide a measure of phase, or phase can be computed directly.

BRIEF DESCRIPTION OF THE SEVERAL VIEWS OF THE DRAWINGS

Additional objects, advantages, and novel features of the invention will become apparent from a consideration of the ensuing description and drawings, in which—

FIG. 2 is a graph of frequency versus sample number for the oscillatory test signal upon which FIG. 1 is based, wherein the frequencies are computed using a zero-crossing technique according to the prior art;

FIG. 3 is a graph of frequency versus sample number for the oscillatory test signal upon which FIGS. 1 and 2 are based, wherein the frequencies are computed in accordance with the invention;

DETAILED DESCRIPTION OF THE INVENTION

An oscillatory test signal, even one whose characteristics change over time, can be regarded as having constant characteristics in the short-term, even if only for a single group of samples. We have recognized that the short-term characteristics of an oscillatory test signal can be mathematically modeled as an idealized sinusoid:

$$x_n = A\cos(n\alpha+\beta)+B. \quad (EQ. 1)$$

In EQ. 1, "$x_n$" represents the value of an $n^{th}$ sample of the test signal. "A" corresponds to test signal's amplitude, B corresponds to its DC offset, α corresponds to its frequency, and β corresponds its phase. A measurement circuit such as a digitizing sampler can directly measure each sample $x_n$. By measuring four consecutive, uniformly spaced samples (e.g., $x_0$ to $x_3$), one can construct four equations in four unknowns, as follows:

$$x_0 = A\cos(\beta)+B \quad (EQ. 2)$$

$$x_1 = A\cos(\alpha+\beta)+B \quad (EQ. 3)$$

$$x_2 = A\cos(2\alpha+\beta)+B \quad (EQ. 4)$$

$$x_3 = A\cos(3\alpha+\beta)+B \quad (EQ. 5)$$

One can solve for the four unknowns, A, B, α, and β, to fit the idealized sinusoid of EQ. 1 to the samples as follows. First, one can eliminate the DC offset, B, by subtracting adjacent datapoints:

$$y_0 = x_1-x_0 = A[\cos(\alpha+\beta)-\cos(\beta)] \quad (EQ. 6)$$

$$y_1 = x_2-x_1 = A[\cos(2\alpha+\beta)-\cos(\alpha+\beta)] \quad (EQ. 7)$$

$$y_2 = x_3-x_2 = A[\cos(3\alpha+\beta)-\cos(2\alpha+\beta)] \quad (EQ. 8)$$

Next, one can introduce the following simplifying relation:

$$\cos((n+1)\alpha+\beta)-\cos(n\alpha+\beta) = 2|\sin(\alpha/2)|\cos(n\alpha+\beta+atan2(\sin\alpha, \cos(\alpha-1))), \quad (EQ. 9)$$

wherein atan2(x, y) equals atan(x, y) for x>=0, and equals π+atan(x, y) for x<0. One can derive the relation of EQ. 9 as follows:

$$\begin{aligned}
\cos((n+1)\alpha+\beta) - \cos(n\alpha+\beta) &= \cos(\alpha+n\alpha+\beta) - \cos(n\alpha+\beta) \\
&= \cos(\alpha)\cos(n\alpha+\beta) - \\
&\quad \sin(\alpha)\sin(n\alpha+\beta) - \cos(n\alpha+\beta) \\
&= (\cos(\alpha)-1)\cos(n\alpha+\beta) - \\
&\quad \sin(\alpha)\sin(n\alpha+\beta) \\
&= SQRT((\cos(\alpha)-1)^2 + \\
&\quad \sin^2(\alpha))[(\cos(\alpha)-1)\cos(n\alpha+\beta) / \\
&\quad SQRT((\cos(\alpha)-1)^2 + \\
&\quad \sin^2(\alpha)) - \sin(\alpha)\sin(n\alpha+\beta) / \\
&\quad SQRT((\cos(\alpha)-1)^2 + \sin^2(\alpha))] \\
&= SQRT((\cos(\alpha)-1)^2 + \\
&\quad \sin^2(\alpha)) * \cos(n\alpha+\beta+ \\
&\quad atan2(\sin\alpha, \cos(\alpha-1))) \\
&= SQRT(\cos^2(\alpha)-2\cos(\alpha)+1) + \\
&\quad \sin^2(\alpha)) * \cos(n\alpha+\beta+ \\
&\quad atan2(\sin\alpha, \cos(\alpha-1))) \\
&= SQRT(2-2\cos(\alpha)) * \cos(n\alpha+\beta+ \\
&\quad atan2(\sin\alpha, \cos(\alpha-1))) \\
&= 2SQRT\left(\frac{1}{2} - \frac{1}{2}\cos(\alpha)\right) * \cos(n\alpha+\beta+ \\
&\quad atan2(\sin\alpha, \cos(\alpha-1))) \\
&= 2|\sin(\alpha/2)| * \cos(n\alpha+\beta+ \\
&\quad atan2(\sin\alpha, \cos(\alpha-1)))
\end{aligned}$$

One can now substitute EQ. 9 into EQS. 6–8 to yield—

$$y_0 = x_1-x_0 = 2A|\sin(\alpha/2)|\cos(\beta+atan2(\sin\alpha, \cos(\alpha-1)))$$

$$y_1 = x_2-x_1 = 2A|\sin(\alpha/2)|\cos(\alpha+\beta+atan2(\sin\alpha, \cos(\alpha-1)))$$

$$y_2 = x_3-x_2 = 2A|\sin(\alpha/2)|\cos(2\alpha+\beta+atan2(\sin\alpha, \cos(\alpha-1)))$$

which can be rewritten as—

$$y_0 = x_1-x_0 = 2A|\sin(\alpha/2)|\cos(-\alpha+\alpha\beta+atan2(\sin\alpha, \cos(\alpha-1)))$$

$$y_1 = x_2-x_1 = 2A|\sin(\alpha/2)|\cos(\alpha+\beta+atan2(\sin\alpha, \cos(\alpha-1)))$$

$$y_2 = x_3-x_2 = 2A|\sin(\alpha/2)|\cos(\alpha+\alpha\beta+atan2(\sin\alpha, \cos(\alpha-1)))$$

Letting $\gamma=\alpha+\beta+\text{atan2}(\sin\alpha, \cos(\alpha-1))$ enables further simplifications:

$$y_0=x_1-x_0=2A|\sin(\alpha/2)|\cos(-\alpha+\gamma) \quad \text{(EQ. 10)}$$

$$y_1=x_2-x_1=2A|\sin(\alpha/2)|\cos(\gamma) \quad \text{(EQ. 11)}$$

$$y_2=x_3-x_2=2A|\sin(\alpha/2)|\cos(\alpha+\gamma) \quad \text{(EQ. 12)}$$

Combining EQS. 10–12 eliminates all variables except $\alpha$:

$$(y_0+y_2)/y_1 = 2A[|\sin(\alpha/2)|\cos(-\alpha+\gamma)+\cos(\alpha+\gamma)]/$$
$$[2A|\sin(\alpha/2)|\cos(\gamma)]$$
$$= (\cos(-\alpha+\gamma)+\cos(\alpha+\gamma))/\cos(\gamma)$$
$$= (\cos(\alpha)\cos(\gamma)+\sin(\alpha)\sin(\gamma)+\cos(\alpha)\cos(\gamma)-$$
$$\sin(\alpha)\sin(\gamma))/\cos(\gamma)$$
$$= 2\cos(\alpha)\cos(\gamma)/\cos(\gamma)$$
$$= 2\cos(\alpha)$$

Applying EQS. 6–8 allows one to solve for $\alpha$:

$$\alpha=a\cos((y_0+y_2)/2y_1)=a\cos((x_3-x_2)-(x_1-x_0))/(2(x_2-x_1))). \quad \text{(EQ. 13)}$$

The frequency (in Hz) of the test signal can then be computed as $2\pi\alpha$.

One can solve EQS. 2–5 for each of the other unknowns. To solve for the phase of the sinusoid, $\beta$, one can divide $y_1$ (EQ. 7) by $y_0$ (EQ. 6):

$$y_1/y_0 = [\cos(2\alpha+\beta)-\cos(\alpha+\beta)]/[\cos(\alpha+\beta)-\cos(\beta)]$$
$$= [\cos 2\alpha\cos\beta - \sin 2\alpha\sin\beta - \cos\alpha\cos\beta + \sin\alpha\sin\beta]/$$
$$[\cos\alpha\cos\beta - \sin\alpha\sin\beta - \cos\beta]$$
$$= [(\cos 2\alpha - \cos\alpha)\cos\beta - (\sin 2\alpha - \sin\alpha)\sin\beta]/$$
$$[(\cos\alpha - 1)\cos\beta - \sin\alpha\sin\beta]$$

Cross-multiplying and collecting terms including $\beta$ yields:

$$[y_1(\cos\alpha-1)-y_0(\cos 2\alpha-\cos\alpha)]\cos\beta = [y_1\sin\alpha - y_0(\sin 2\alpha - \sin\alpha)]\sin\beta.$$

Therefore, $$\beta = \text{atan}\{[y_1(\cos\alpha-1)-y_0(\cos 2\alpha-\cos\alpha)]/[y_1\sin\alpha - y_0(\sin 2\alpha - \sin\alpha)]\}. \quad \text{(EQ. 14)}$$

Except for the atan operation, all trigonometric computations can be avoided by employing the following identities:

$$\cos\alpha=(y_0+y_2)/2y_1=((x_3-x_2)-(x_1-x_0))/(2(x_2-x_1))$$

$$\cos 2\alpha = 2\cos^2\alpha - 1$$

$$\sin\alpha = SQRT(1-\cos^2\alpha)$$

$$\sin 2\alpha = 2\sin\alpha\cos\alpha.$$

$$y_0=x_1-x_0$$

$$y_1=x_2-x_1$$

One can also solve for the amplitude A of the sinusoid using EQ. 6:

$$A = y_0/[\cos(\alpha+\beta)-\cos(\beta)] = y_0/[\cos(\alpha+\beta)-\cos(\beta)]. \quad \text{(EQ. 15)}$$

Finally, one can solve for DC offset B using EQ. 2:

$$B = A\cos(\beta)-x_0 \quad \text{(EQ. 16)}$$

This "sinusoidal fit" technique can estimate the frequency of a test signal much more quickly than the DFT method. It requires only one trigonometric operation and several arithmetic operations. Although its computational requirements are on the same order as the zero-crossing technique's, the sinusoidal fit technique is more accurate because it avoids errors in linear interpolation. Because it fits the samples to a sinusoid, not to a straight line, the sinusoidal fit technique more closely estimates the oscillatory behavior of the test signal.

To prevent aliasing, the test signal should be sampled at a rate that equals or exceeds the Nyquist rate of the test signal. Preferably, the four samples $x_0-x_3$ should fall within a single period of the test signal. This is not strictly required, however. Frequencies can be accurately deduced for a wide range of sampling intervals. In a typical testing application, the frequency of a test signal is approximately known in advance. By specifying the sampling rate of the digitizer based on the expected frequency of the test signal, the range over which the sinusoidal fit technique operates accurately will generally be wide enough to encompass the normal frequency variations of the test signal.

Figure 1:
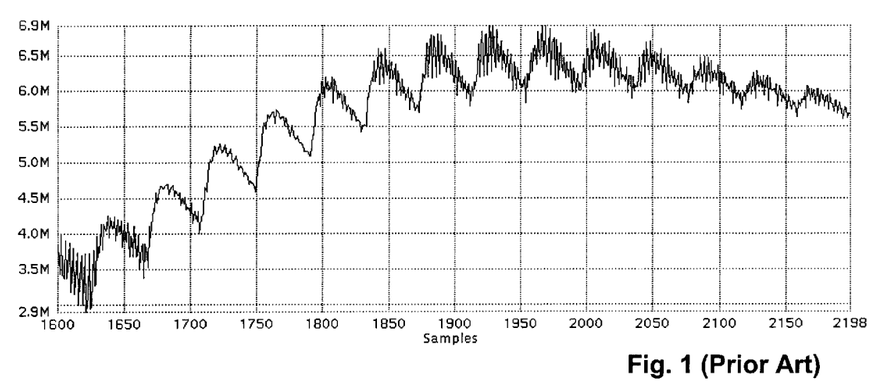
FIG. 1 is a graph of frequency versus sample number for an oscillatory test signal, wherein the displayed frequencies are computed using a Discrete Fourier Transform (DFT) technique according to the prior art.
Figure 2:
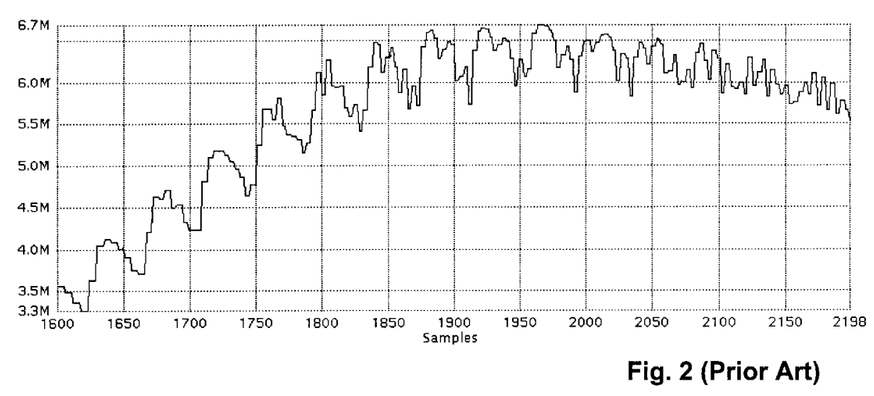
Figure 3:
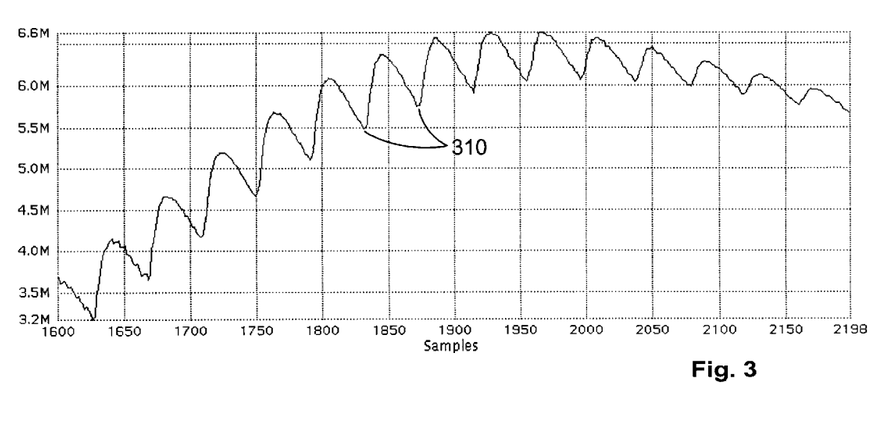
Figure 4:
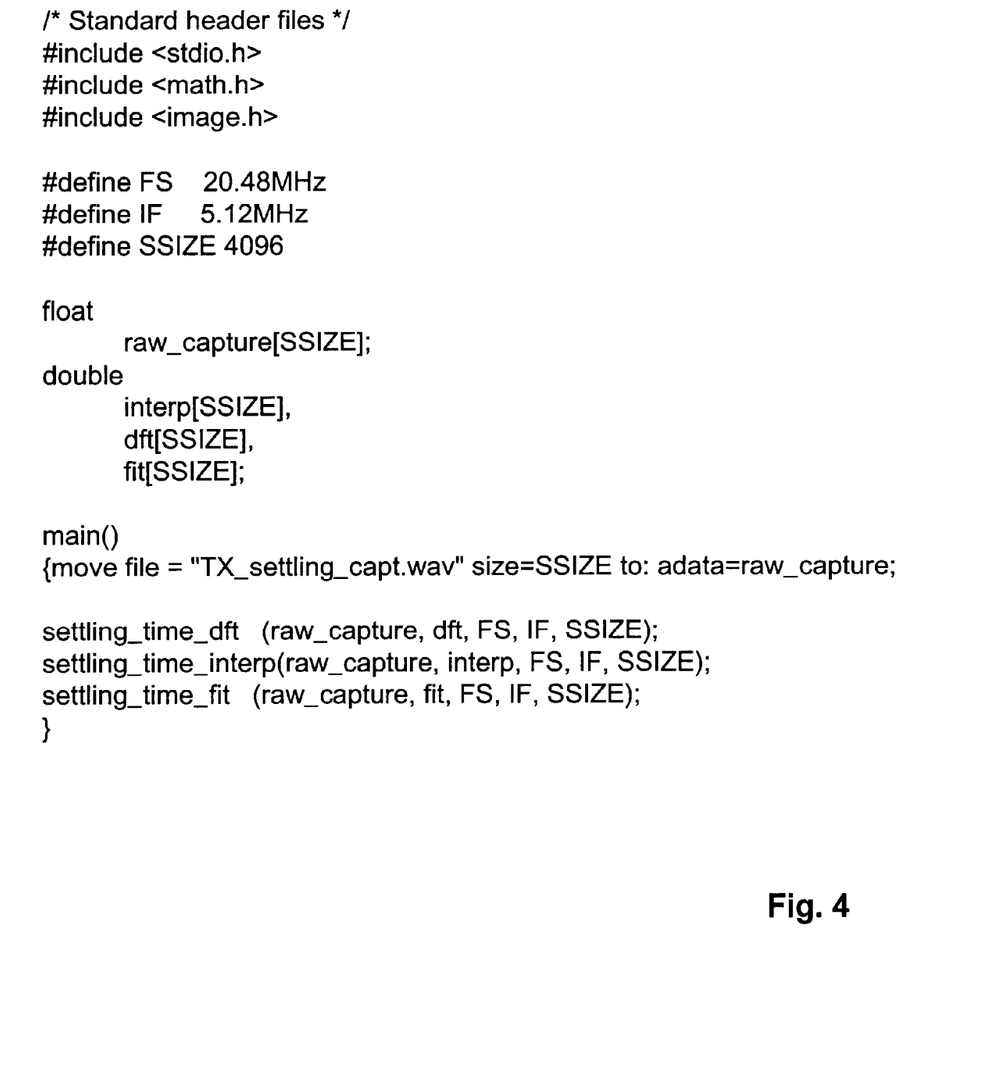
FIG. 4 is a software listing showing module-level definitions and a main routine for comparing results of different techniques for estimating the frequency of an oscillatory test signal.
Figure 5A:
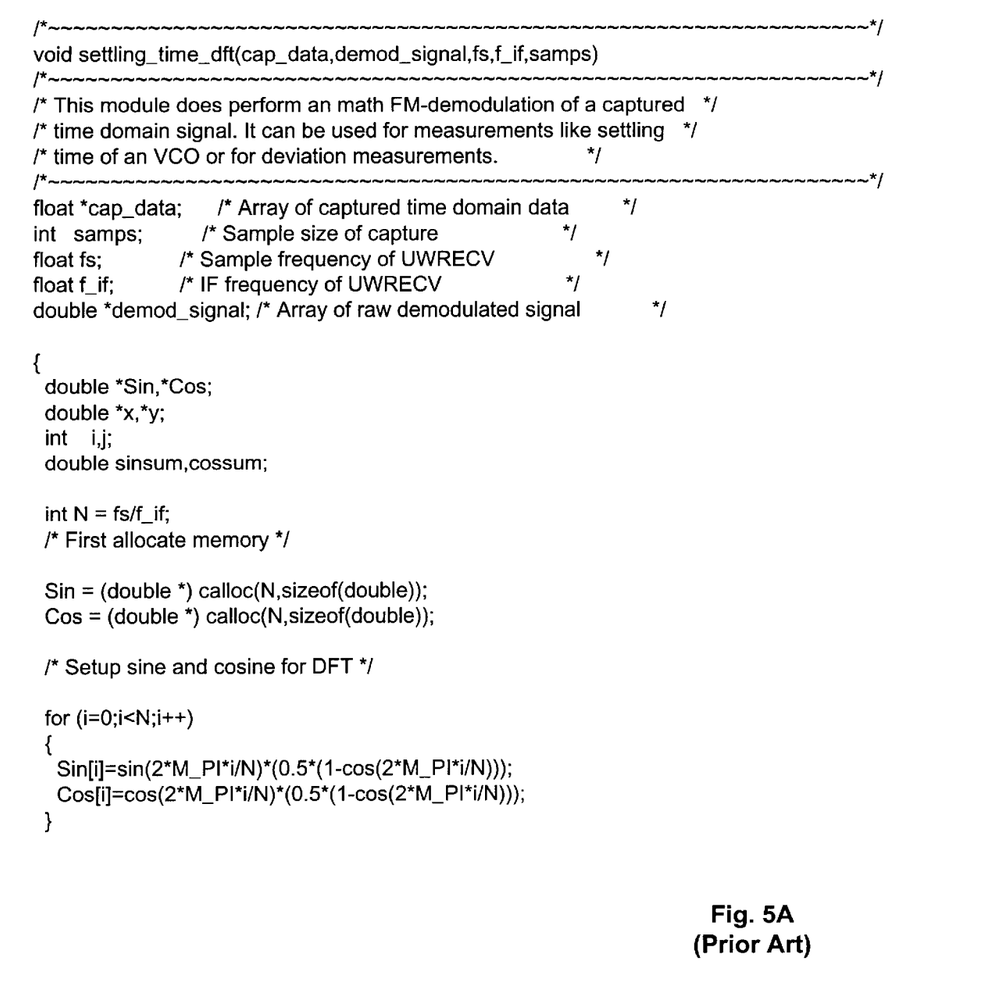
FIGS. 5A and 5B are software listings of the DFT technique used to generate the graph of FIG. 1.
Figure 5B:
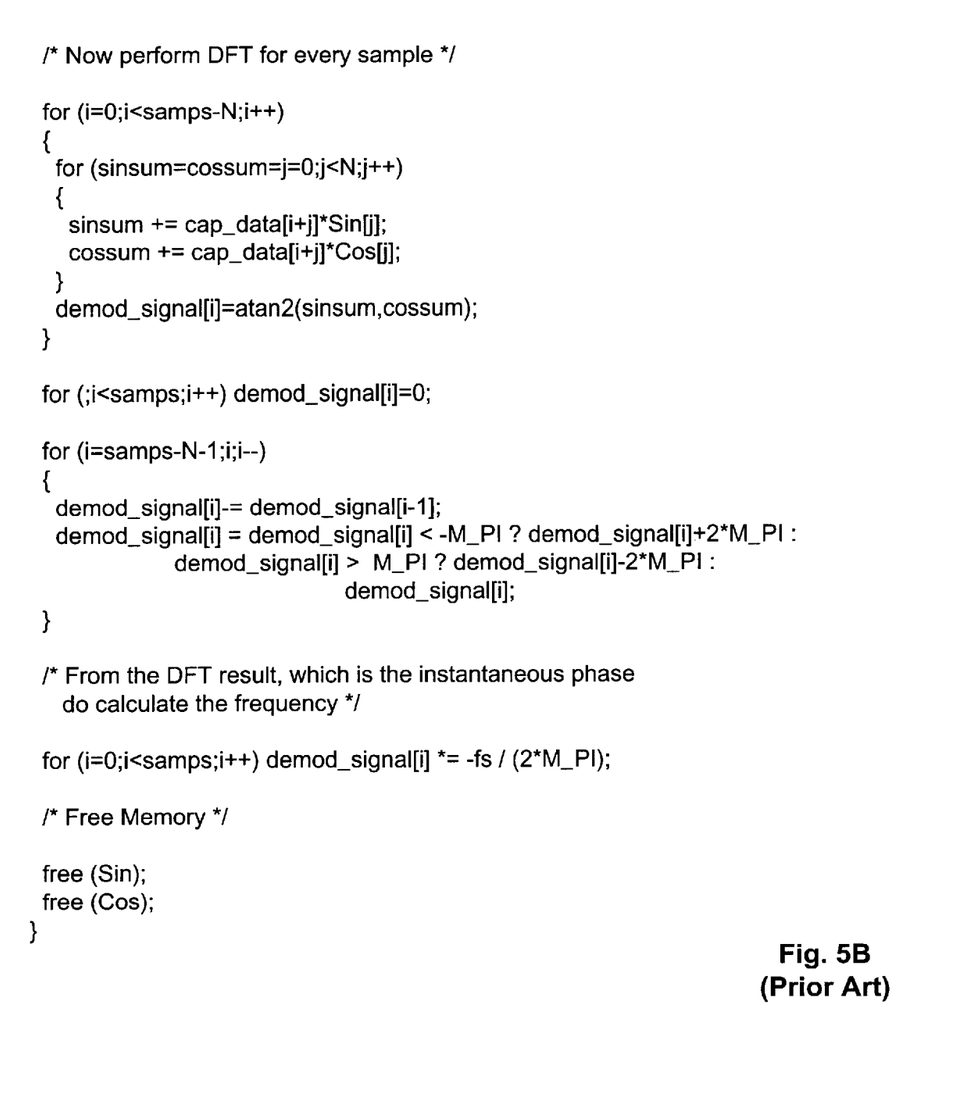
Figure 6:
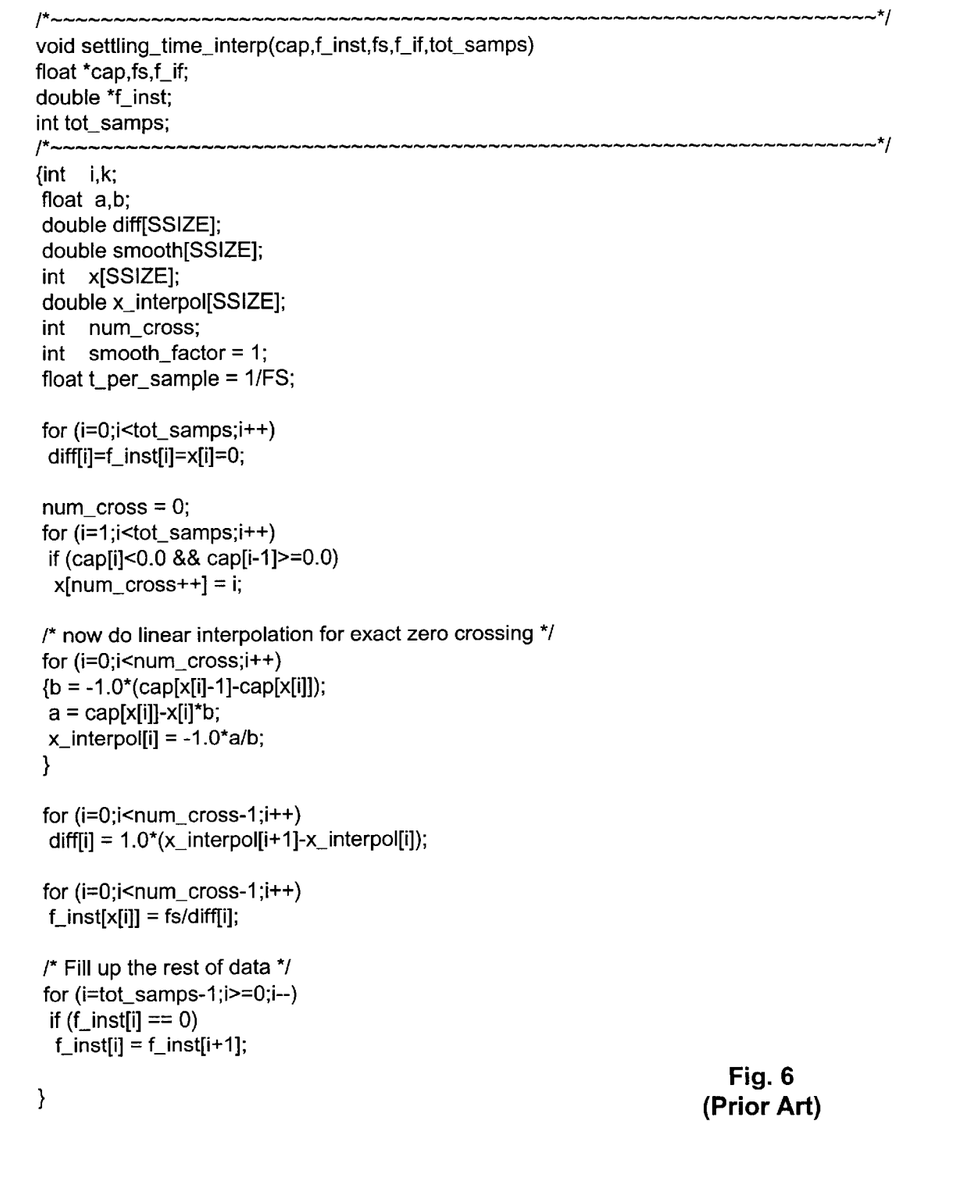
FIG. 6 is a software listing of the zero-crossing technique used to generate the graph of FIG. 2.
Figure 7:
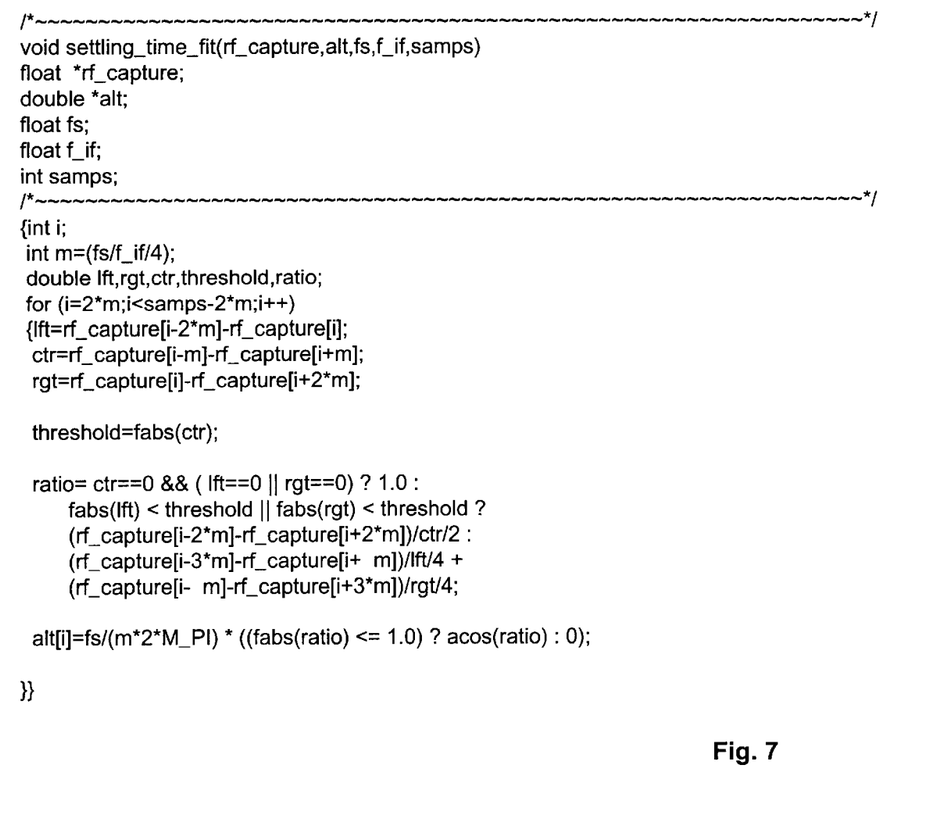
FIG. 7 is an example of a software listing of a technique according to the invention for generating the graph of FIG. 3.

FIGS. 1–3 show the results of three different frequency estimating techniques operating on the same data set. The data set was acquired by sampling the output of a voltage-controlled oscillator (VCO) at a rate of 20.48 MHz, as the VCO responds to power being applied to its power supply terminals. FIG. 1 shows the DFT technique, FIG. 2 shows the zero-crossing technique, and FIG. 3 shows the sinusoidal fit technique. FIGS. 4–7 show listings of the software used to generate the graphs of FIGS. 1–3.

The frequency reported by the sinusoidal fit technique has notably lower noise than the other two methods. The lower noise derives from the fact that the technique yields more accurate results than the alternatives. Noise remains low even though test signal's frequency varies by a factor of three.

Numerous advantages derive from lower noise. Lower noise allows a test program to determine quickly when a test signal has settled, without the need for additional averaging or delays. It also enables one to examine nuances in the test signal's settling characteristics, which otherwise might be concealed. For example, the sinusoidal fit technique reveals, more sharply than the other methods, a periodic component 310 in the settling characteristic of the VCO.

Figure 8:
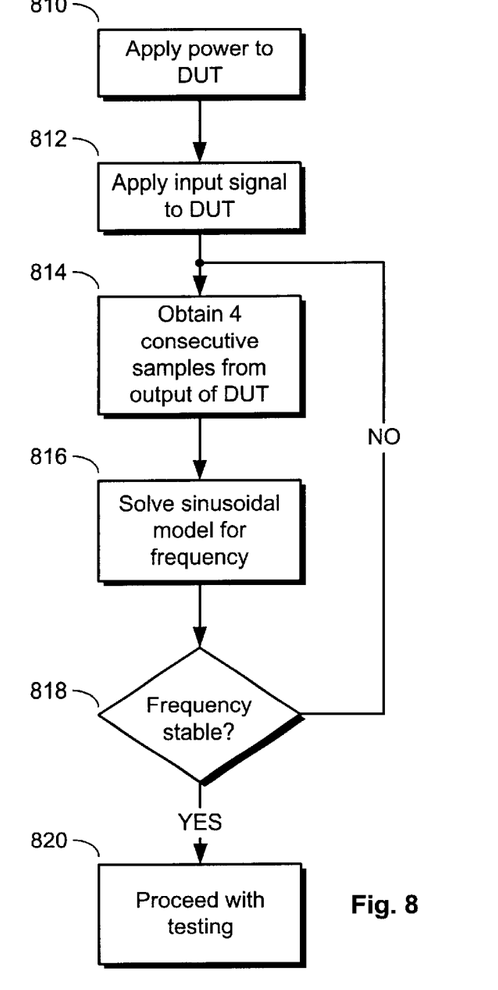
FIG. 8 is a flowchart showing a process according to the invention for testing a device that has an indeterminate settling time.
Figure 9:
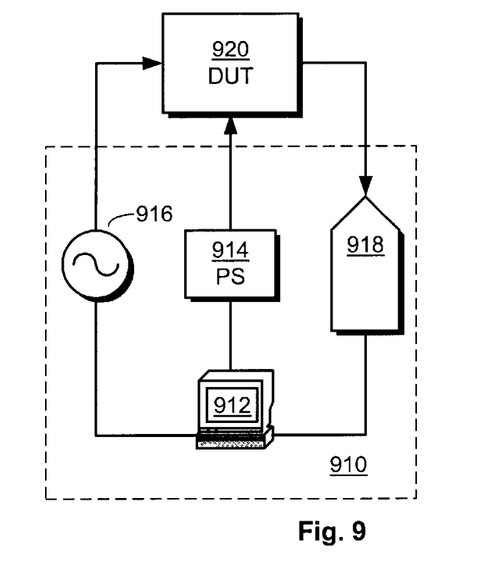
FIG. 9 is a highly simplified block diagram of a test system in which the process of FIG. 8 can be performed.

FIG. 8 shows a process for using the sinusoidal fit technique to determine when a test signal has settled. This method is preferably performed by a test program running on an automatic test system. FIG. 9 shows a highly simplified diagram of an automatic test system 910. The automatic test system 910 includes a test computer 912, a power supply 914, a sourcing circuit 916, and a measurement circuit 918. According to the method, the tester 910 applies power to a DUT 920 (step 810). Depending upon the type of device, the tester may also apply an input signal to the DUT (step 812). If the DUT is a VCO, for example, the device requires a separate input signal for establishing an output frequency. If the device is a fixed oscillator or similar device, however, no separate input signal is needed, in which case step 812 may be omitted.

According to this technique, the sinusoidal fit technique can be commenced at any time before the output signal is expected to have settled. Steps 814–816 show a single iteration of this technique. The measurement circuit 918 obtains four consecutive samples from the output of the DUT (step 814). The test computer 912 fits the samples to a sinusoidal model (step 816) by solving the model's equations for frequency. Upon completion of step 816, a single frequency point is established. The test program then repeats the sinusoidal fit technique until the frequencies reach a stable value. Once stability is attained, the test program can proceed (step 820).

The particular requirements of a test dictate the manner in which the sinusoidal fit technique progresses through the sampled data. If a device is expected to settle quickly, then the technique should preferably be repeated at a high rate. At the limit, the technique can be performed once for every sample. For instance, the technique can first be performed on samples $x_0$, $x_1$, $x_2$, and $X_3$, then on samples, $x_1$, $x_2$, $x_3$, and $x_4$, then on samples $x_2$, $x_3$, $x_4$, and $x_5$, and so on. If, however, the device is expected settle slowly, then the technique can be repeated less often, for example, once every 100 samples.

Testing requirements also dictate when the test signal is deemed to have settled. Typically, the test program stores a frequency "window" having a high limit and a low limit. The test signal is deemed to have settled when its frequency remains within the window for a designated period of time. This is merely an example, however. The specific manner in which the test signal is deemed to have settled is not critical to the invention.

The tester's computer may operate in connection with digital signal processing hardware. This may include specialized circuits or one or more auxiliary processors that communicate with the test computer to increase throughput.

Alternatives

Having described one embodiment, numerous alternative embodiments or variations can be made. As described herein, consecutive samples are used to estimate the test signal's characteristics. However, a tester can instead sample the test signal at a high sampling rate and examine only a regularly spaced fraction of the samples taken. Examining every tenth sample is equivalent to examining consecutive samples at one-tenth the sampling rate. The invention is not limited, therefore, to strictly consecutive samples.

The sinusoidal fit technique can also be used in connection with sample rate conversion. As known to those skilled in the art, sample rate conversion maps actual samples of a signal taken with one sampling clock to synthesized samples referenced to a different sampling clock. Sample rate conversion is especially useful in this context for examining non-uniformly sampled test signals. Using sample rate conversion, samples that are non-uniformly spaced but have precisely known timing can be converted into regularly spaced samples, which are amenable to the sinusoidal fit technique described herein.

In addition, analog or digital filters can be applied to the test signal, prior to processing by the sinusoidal fit technique. The sinusoidal fit technique can also incorporate digital filtering in its computations, if desired, to eliminate the need for multiple filtering stages.

The sinusoidal fit technique has been shown and described herein for determining when a device under test settles. This is merely one of many possible applications, however. Another area in which the technique can be used is for examining the response characteristics of a test signal. For instance, the technique can examine the frequency changes at the output of a VCO as it responds to an input voltage step. It can also examine the frequency noise on a test signal, or transient effects caused by a variety of circuit disturbances.

Figure 10:
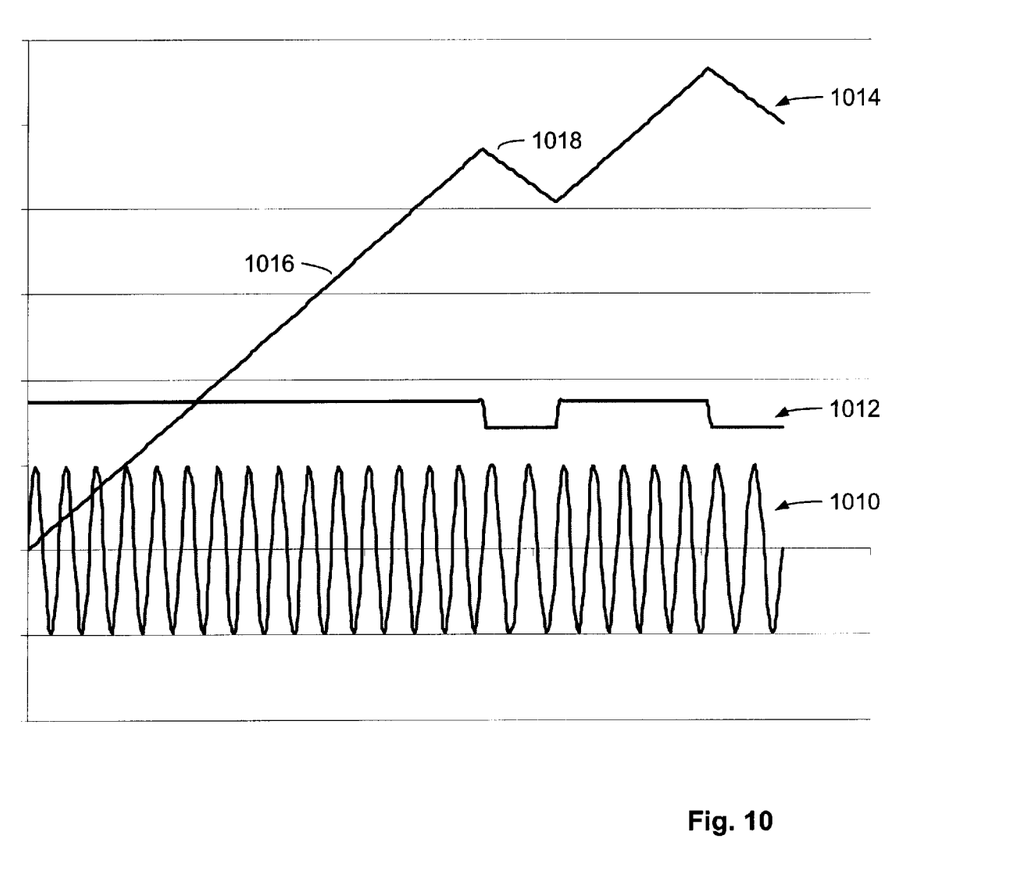
FIG. 10 is a plot of frequency and phase of a modulated test signal, which can be examined according to the invention.

The technique is also useful for testing telecommunications devices, such as those that employ frequency modulation or phase modulation. Because the sinusoidal fit technique has low noise and can be updated on a cycle-to-cycle basis (or more frequently), it can be used for examining modulated signals carried on these devices. For example, a test system can capture the output of a modulating transmitter and examine its characteristics. FIG. 10 shows a plot of a modulated test signal 1010 and its frequency 1012 as a function of time. In addition to determining frequency, the sinusoidal fit technique can also determine the relative phase of the test signal. One way of determining relative phase is by integrating the frequency values the technique produces with respect to time. As is known, phase is mathematically the integral of frequency. Using numerical techniques, phase can be computed by adding (accumulating) each new frequency value with the sum of all previous values. The function 1014 represents the normalized phase of the test signal 1010. Because phase continues to grow as frequencies accumulate, phase is more easily observed by first subtracting, or normalizing, the center frequency of the modulated test signal from each frequency value, before accumulating the frequency value with its predecessors. The normalized phase function, known in the art as a "phase plot," therefore reveals changes in phase from normal. For example, portion 1016 represents a region where phase is increasing relative to normal; portion 1018 represents a region where phase is decreasing relative to normal. A test program can analyze these changes to determine whether a modulating transmitter is properly and accurately generating the modulated test signal.

Each of these alternatives and variations, as well as others, has been contemplated by the inventor and is intended to fall within the scope of the instant invention. It should be understood, therefore, that the foregoing description is by way of example, and the invention should be limited only by the spirit and scope of the appended claims.

What is claimed is:

1. In an automatic system for testing electronic components, a method for determining the characteristics of an oscillatory test signal produced by a device under test, comprising:
   (A) acquiring a plurality of samples of the test signal;
   (B) mathematically fitting a sinusoidal model to the samples, the sinusoidal model specifying a plurality of equations having unknowns representing characteristics of a sinusoidal signal that substantially intersects the plurality of samples; and
   (C) solving the plurality of equations for at least one of the unknowns to reveal at least one characteristic of the test signal,
   wherein each of the plurality of equations is substantially of the form $x_n = A \cos(n\alpha + \beta) + B$, wherein "$X_n$" is the $n^{th}$ sample, "A" corresponds to amplitude, B corresponds to DC offset, $\alpha$ corresponds to frequency, and $\beta$ corresponds to phase of the sinusoidal signal specified by the model.

2. A method as recited in claim 1, wherein the plurality of samples is four samples evenly distributed in time.

3. A method as recited in claim 2, wherein the plurality of samples is acquired at a sampling raze as least as fast as the Nyquist rate of die test signal.

4. A method as recited in claim 1, further comprising repetitively performing steps A–C for different pluralities of samples white monitoring the at least one characteristic of the test signal.

5. In an automatic system for testing electronic components, a method for determining the characteristics of an oscillatory test signal produced by a device under test, comprising:

(A) acquiring a plurality of samples of the test signal;

(B) mathematically fitting a sinusoidal model to the samples, the sinusoidal model specifying a plurality of equations having unknowns representing characteristics of a sinusoidal signal that substantially intersects the plurality of samples;

(C) solving the plurality of equations for at least one of the unknowns to reveal at least one characteristic of the test signal, (D) repetitively performing steps A–C for different pluralities of samples while monitoring the at least one characteristic of the test signal; and (E) determining when the at least one characteristic of the test signal has settled to a stable value.

6. A method as recited in claim 4, further comprising storing the at least one characteristic as a function of time.

7. A method as recited in claim 6, further comprising displaying the at least one characteristic as a function of time.

8. A method as recited in claim 1, wherein the at least one characteristic of the test signal is frequency.

9. A method as recited in claim 8, further comprising accumulating frequency measurements of the test signal to generate an indication of phase of the test signal.

10. A method as recited in claim 9, wherein the device under test is a transmitting device that encodes data using one of phase modulation and frequency modulation, and further comprising monitoring the at least one characteristic of the test signal to determine whether the transmitting device accurately modulates data.

11. A method as recited in claim 1, wherein the device under test is a transmitting device that encodes data using one of phase modulation and frequency modulation, and further comprising monitoring the at least one characteristic of the test signal to determine whether the transmitting device accurately modulates data.

12. A method of testing a device to determine whether it is operating properly, comprising:

(A) applying power to the device;

(B) waiting for an output signal from the device to settle, including—
  (i) sampling the output signal from the device,
  (ii) mathematically fitting a sinusoidal model to the samples, the sinusoidal model specifying a plurality of equations having unknowns representing characteristics of an ideal sinusoid substantially intersecting the plurality of samples,
  (iii) solving the plurality of equations for at least one of the unknowns to reveal at least one characteristic of the test signal, and
  (v) repeating steps i–iv until the at least one characteristic of the test signal settles; and (C) resuming testing activities, upon the completion of step (B).

13. A method as recited in claim 12, wherein the testing activities comprise:

measuring a characteristic of the device under test; and comparing the measured characteristic with at least one expected value to determine whether the device passes or fails.

14. A method as recited in claim 12, controlled by a test program running on an automatic test system for testing electronic devices.

15. A method as recited in claim 14, further comprising production testing devices under test.

16. A method for testing a device to determine whether it is operating properly, comprising:

(A) inducing a transient in the device;

(B) monitoring the response of the device to the transient, including—
  (i) sampling the output signal from the device,
  (ii) mathematically fitting a sinusoidal model to the samples, the sinusoidal model specifying a plurality of equations having unknowns representing characteristics of an ideal sinusoid substantially intersecting the plurality of samples,
  (iv) solving the plurality of equations for at least one of the unknowns to reveal at least one characteristic of the test signal, and
  (v) repeating steps i–iv to track the at least one characteristic as a function of time; and (C) comparing the at least one characteristic with at least one expected value, to determine whether the device passes or fails.

17. A method as recited in claim 16, further comprising displaying, for visual examination, the at least one characteristic as a function of time.

18. A method as recited in claim 16, performed by an automatic test system for testing electronic devices.

19. An automatic test system as recited in claim 1, wherein the processing means comprises a rest computer.

20. An automatic test system as recited in claim 19, wherein the processing means further comprises Digital Signal Processing (DSP) hardware.

21. An automatic test system as recited in claim 1, further comprising:

at least one power supply for applying power to the device under test; and at least one stimulus circuit for applying an input signal to the device under test.

22. An automatic system for testing electronic components, comprising:

a measurement circuit for acquiring samples from an output signal of a device under test; and processing means for running a test program for testing the device under test, including— means for mathematically fitting a sinusoidal model to the samples, the sinusoidal model specifying a plurality of equations having unknowns representing characteristics of an ideal sinusoid substantially intersecting the plurality of samples, means for solving the plurality of equations for at least one of the unknowns to reveal at least one characteristic of the test signal, and means for repetitively operating the means for mathematically fitting and the means for solving to ascertain changes in the at least one characteristic as a function of time, wherein each of the plurality of equations is substantially of the form $x_n = A\cos(n\alpha + \beta) + B$, wherein "$x_n$" is the $n^{th}$ sample, "A" corresponds to amplitude, B corresponds to DC offset, $\alpha$ corresponds to frequency, and $\beta$ corresponds to phase.

* * * * *